United States Patent
Yan et al.

(10) Patent No.: US 11,924,496 B2
(45) Date of Patent: Mar. 5, 2024

(54) CHANNEL SWITCHING METHOD FOR DISPLAY APPARATUS, AND DISPLAY APPARATUS

(71) Applicant: HISENSE VISUAL TECHNOLOGY CO., LTD., Shandong (CN)

(72) Inventors: Weijia Yan, Shandong (CN); Xudong Li, Shandong (CN); Wenxiao Liu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/152,378

(22) Filed: Jan. 10, 2023

(65) Prior Publication Data

US 2023/0188777 A1 Jun. 15, 2023

Related U.S. Application Data

(63) Continuation of application No. PCT/CN2021/114955, filed on Aug. 27, 2021.

(30) Foreign Application Priority Data

Dec. 7, 2020 (CN) .......................... 202011419015.3
Jul. 2, 2021 (CN) .......................... 202110748616.7

(51) Int. Cl.
 *H04N 21/422* (2011.01)
 *H04N 5/50* (2006.01)
 (Continued)

(52) U.S. Cl.
 CPC ......... *H04N 21/42214* (2013.01); *H04N 5/50* (2013.01); *H04N 7/0887* (2013.01);
 (Continued)

(58) Field of Classification Search
 CPC ....... H04N 21/42214; H04N 21/42204; H04N 21/4383; H04N 21/4823; H04N 5/50; H04N 7/0887
 (Continued)

(56) References Cited

U.S. PATENT DOCUMENTS 6,775,843 B1 * 8/2004 McDermott ......... H04N 21/426
 725/38
7,057,673 B1 * 6/2006 Weber .............. H04N 21/42204
 348/731

(Continued)

FOREIGN PATENT DOCUMENTS

CN 1647513 A 7/2005
CN 1929573 A 3/2007
(Continued)

OTHER PUBLICATIONS

International Search Report, dated Nov. 25, 2021, from PCT/CN2021/114955.

(Continued)

*Primary Examiner* — Tom V Sheng
(74) *Attorney, Agent, or Firm* — Workman Nydegger

(57) ABSTRACT

The application provides a channel switching method for a display apparatus, and a display apparatus. The display apparatus includes: a display, a remote control, a communicator, an input interface and a controller, the controller is configured to perform: receiving a channel switch instruction generated from an input number, taking the input number as a digital channel number for a first round of channel search, and determining whether a first channel corresponding to the digital channel number exists in a channel table stored in the display apparatus; in response to the first channel not existing in the channel table, further processing the input number to obtain a processed input number and taking processed input number as a physical (Continued)

channel number for a second round of channel search; and in response to the first channel existing in the channel table, control the display to play content from the first channel.

18 Claims, 10 Drawing Sheets

(51) Int. Cl.
  *H04N 7/088* (2006.01)
  *H04N 21/438* (2011.01)
  *H04N 21/482* (2011.01)
(52) U.S. Cl.
  CPC ..... *H04N 21/4383* (2013.01); *H04N 21/4823* (2013.01); *H04N 21/42204* (2013.01)
(58) Field of Classification Search
  USPC ......................................................... 345/169
  See application file for complete search history.

(56) References Cited

U.S. PATENT DOCUMENTS

| | | | | |
|---|---|---|---|---|
| 2002/0181712 | A1* | 12/2002 | Tsubouchi | H04H 40/18 381/2 |
| 2002/0186327 | A1* | 12/2002 | Inui | H04N 21/4882 348/569 |
| 2004/0163108 | A1* | 8/2004 | Takagi | H04N 21/433 725/50 |
| 2005/0100053 | A1* | 5/2005 | Kang | H04H 40/18 725/135 |
| 2006/0250527 | A1* | 11/2006 | Yoon | H04N 5/50 348/731 |
| 2008/0288984 | A1* | 11/2008 | Lee | H04N 21/42204 725/56 |
| 2009/0013371 | A1* | 1/2009 | Shibahara | H04N 21/4348 725/134 |
| 2010/0060786 | A1* | 3/2010 | Kim | H04N 21/4383 725/38 |
| 2013/0055313 | A1* | 2/2013 | Eyer | H04N 21/472 725/49 |
| 2014/0354890 | A1* | 12/2014 | Eyer | H04N 21/4524 348/732 |
| 2021/0014572 | A1* | 1/2021 | Lee | H04N 21/234 |

FOREIGN PATENT DOCUMENTS

| | | |
|---|---|---|
| CN | 1960454 A | 5/2007 |
| CN | 102547464 A | 7/2012 |
| CN | 103475940 A | 12/2013 |
| CN | 103686378 A | 3/2014 |
| CN | 105472413 A | 4/2016 |
| CN | 108513157 A | 9/2018 |
| CN | 109194996 A | 1/2019 |
| CN | 109348285 A | 2/2019 |
| CN | 110737487 A | 1/2020 |
| CN | 111263222 A | 6/2020 |
| CN | 111641793 A | 9/2020 |
| CN | 111726673 A | 9/2020 |
| CN | 112153440 A | 12/2020 |
| CN | 112584229 A | 3/2021 |
| WO | 2006089022 A1 | 8/2006 |

OTHER PUBLICATIONS

Chinese First Office Action, dated Feb. 23, 2022, from Chinese App. No. 202110748616.7.
Chinese Second Office Action, dated Jul. 12, 2022, from Chinese App. No. 202011419015.3.
Chinese First Office Action, dated Jan. 4, 2022, from Chinese App. No. 202011419015.3.

* cited by examiner

CHANNEL SWITCHING METHOD FOR DISPLAY APPARATUS, AND DISPLAY APPARATUS

CROSS-REFERENCE OF RELATED APPLICATIONS

The present application is a continuation application of PCT Application No. PCT/CN2021/114955, filed on Aug. 27, 2021, which claims the priorities to Chinese Patent Application No. 202011419015.3, filed on Dec. 7, 2020 and No. 202110748616.7, filed on Jul. 2, 2021, all of them are incorporated herein by reference.

FIELD OF INVENTION

The present application relates to display apparatuses, and particularly relates to a display apparatus and channel switch method for the display apparatus.

BACKGROUND

As a common household appliance, the display apparatus, such as smart television, has already been available to households throughout the world. With the display apparatus, a user can watch programs for entertainment and can use a remote controller to switch channels to locate a desirable program channel for view.

BRIEF SUMMARY

Embodiments of the present application provide a channel switch method for a display apparatus, and the display apparatus. The display apparatus includes a display, configured to display an image from broadcast system or network and/or a user interface; a remote control including one or more number buttons; a communicator configured to communicate with a server via network; an input interface, configured to receive an input signal from the remote control; and a controller, in connection with the display, the communicator and the input interface and configured to perform: receiving a channel switch instruction generated from an input number via the remote control, taking the input number as a digital channel number for a first round of channel search, and determining whether a first channel corresponding to the digital channel number exists in a channel table stored in the display apparatus, where the channel table includes a physical channel number and one or more digital channel number corresponding to the physical channel number; in response to the first channel not existing in the channel table, further processing the input number to obtain a processed input number and taking processed input number as a physical channel number for a second round of channel search, and determining whether a second channel corresponding to the physical channel number exists in the channel table; and in response to the first channel existing in the channel table, control the display to play content from the first channel.

A channel switching method for a display apparatus is provided and the method includes: receiving a channel switch instruction generated from an input number via a remote control of the display apparatus, taking the input number as a digital channel number for a first round of channel search, and determining whether a first channel corresponding to the digital channel number exists in a channel table stored in the display apparatus, where the channel table includes a physical channel number and one or more digital channel number corresponding to the physical channel number; in response to the first channel not existing in the channel table, further processing the input number to obtain a processed input number and taking processed input number as a physical channel number for a second round of channel search, and determining whether a second channel corresponding to the physical channel number exists in the channel table; and in response to the first channel existing in the channel table, control a display to play content from the first channel.

DETAILED DESCRIPTION OF THE EMBODIMENTS

In order to make the objectives and embodiments of the present application clearer, the embodiments of the present application will be described clearly and completely below with reference to the drawings in the embodiments of the present application. Obviously, the embodiments described are some rather than all of the embodiments of the present application.

It should be noted that the brief description of the terms in the present application is for convenience of understanding the following embodiments described, and is not intended to limit the embodiments of the present application. Unless otherwise noted, these terms should be understood according to their common and usual meanings.

Figure 1:
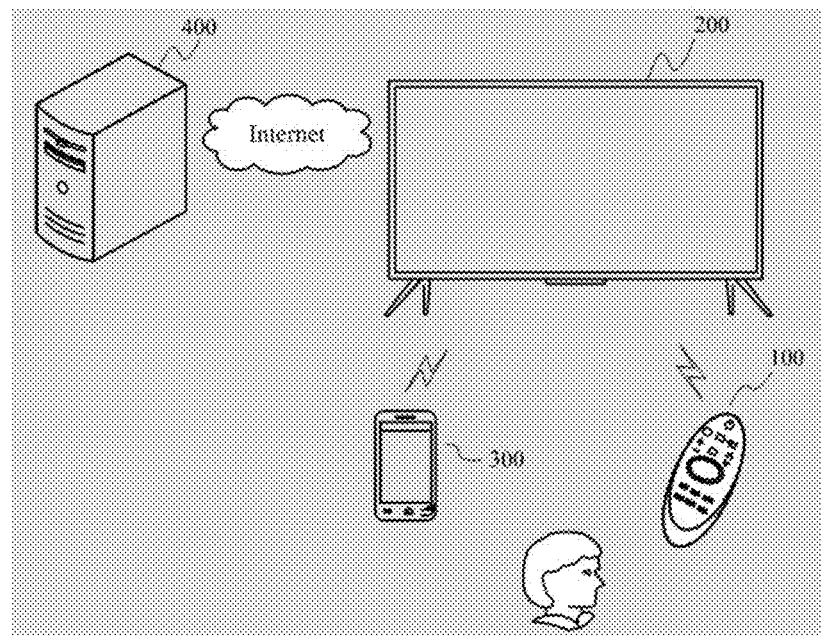
FIG. 1 shows an operation scenario of a display apparatus according to some embodiments.

FIG. 1 is a schematic diagram of an operation scenario of a display apparatus according to an embodiment. As shown in FIG. 1, a display apparatus 200 is further in data communication with a server 400. A user may operate the display apparatus 200 by means of a smart device 300 or a control device 100.

In some embodiments, a control device 100 may be a remote control, communication between the remote control and a display apparatus includes at least one of infrared protocol communication, Bluetooth protocol communication and other short-distance communication, and the control device controls the display apparatus 200 by means of a wireless or wired method. A user may input a command by means of at least one of a button, a voice input, a panel input, etc. on the remote control to control a display apparatus 200.

In some embodiments, a smart device 300 may include any one of a mobile terminal, a tablet computer, a computer, a notebook computer, an augmented reality (AR) device/virtual reality (VR) device, etc.

In some embodiments, a smart device 300 may be used to control a display apparatus 200. For example, an application running on the smart device is used to control a display apparatus 200.

In some embodiments, a smart device 300 may be in data communication with a display apparatus.

In some embodiments, a display apparatus 200 may be controlled by a device besides a control device 100 and a smart device 300. For example, a module for obtaining voice commands arranged inside the display apparatus 200 directly receives a voice command from a user for control of the display apparatus, or a voice device arranged outside the display apparatus 200 receives a voice command from a user for control of the display apparatus.

In some embodiments, the display apparatus 200 is further in data communication with a server 400. The display apparatus 200 can establish communication with a server via a local area network (LAN), a wireless local area network (WLAN) or other networks. The server 400 may provide various contents and interactions for the display apparatus 200. The server 400 may be one or more clusters, and may include one or more types of servers.

Figure 2:
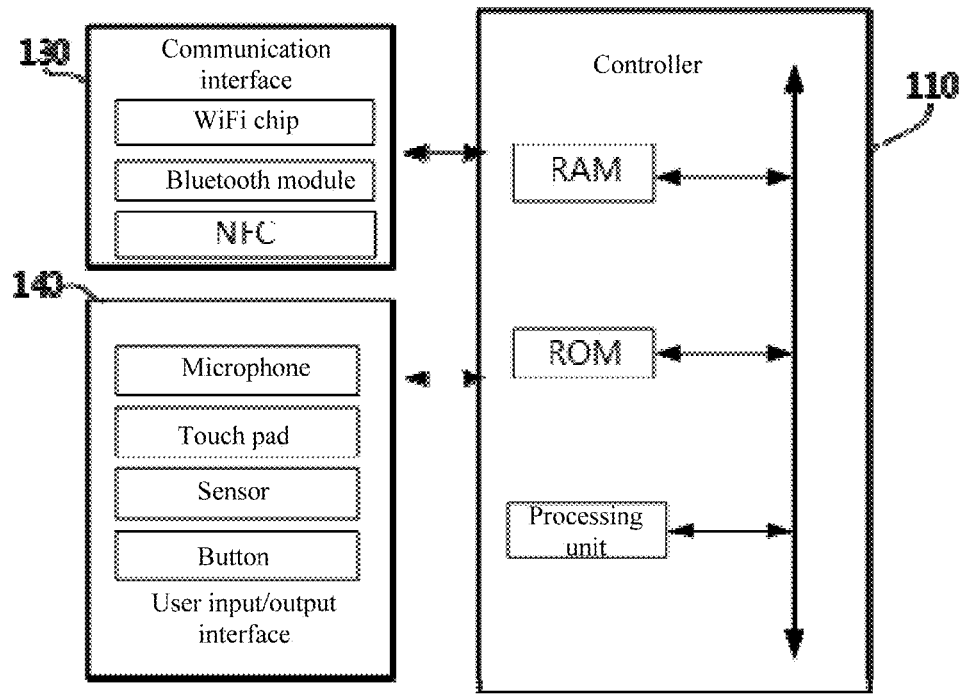
FIG. 2 is a configuration block diagram of hardware of a control device 100 according to some embodiments.

FIG. 2 illustrates a configuration block diagram of a control device 100 according to an embodiment. As shown in FIG. 2, the control device 100 includes a controller 110, a communication interface 130, a user input/output interface 140, a memory, and a power supply. The control device 100 may receive a command from a user, and converts the command into an instruction that may be identified and responded by a display apparatus 200, so as to serve as an interface between the user and the display apparatus 200.

In some embodiments, the communication interface 130 is used for communication with an outside, and includes at least one of a WIFI chip, a Bluetooth module, a near field communication (NFC) module or an alternative module.

In some embodiments, a user input/output interface 140 includes at least one of a microphone, a touch pad, a sensor, a button or an alternative module.

Figure 3:
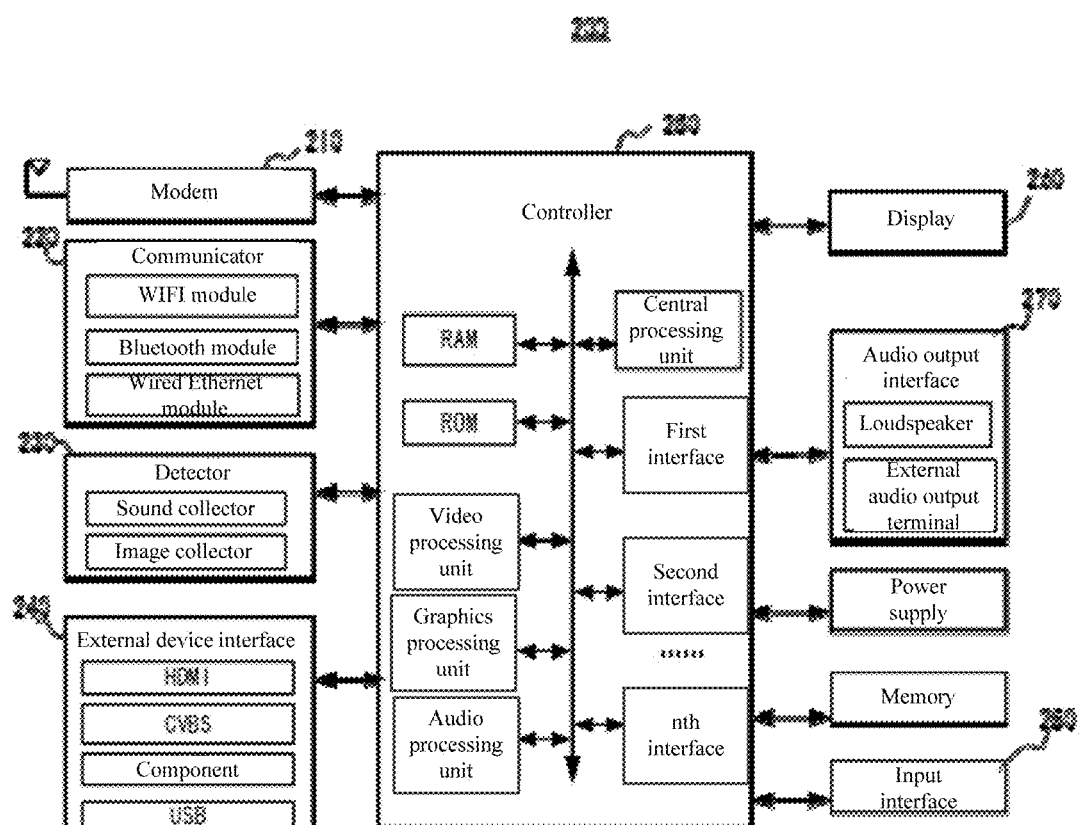
FIG. 3 is a configuration block diagram of hardware of a display apparatus 200 according to some embodiments.

FIG. 3 shows a configuration block diagram of hardware of a display apparatus 200 according to an embodiment.

In some embodiments, a display apparatus 200 includes at least one of a modem 210, a communicator 220, a detector 230, an external device interface 240, a controller 250, a display 260, an audio output interface 270, a memory, a power supply and an input interface.

In some embodiments, a controller includes a central processing unit, a video processing unit, an audio processing unit, a graphics processing unit, an RAM, a read only memory (ROM), and a first interface to an nth interface for input/output.

In some embodiments, a display 260 includes a panel component for presenting an image and a drive component for driving image display, and is used for receiving an image signal output from a controller, and displaying a video content, image content, an item of a menu operation interface, a user interface (UI) for user operation, etc.

In some embodiments, a display 260 may be at least one of a liquid crystal display, an organic light-emitting diode (OLED) display, or a projection display, and may further be a projection apparatus and a projection screen.

In some embodiments, a modem 210 receives a broadcast television signal by means of a wired or wireless method, and demodulates audio and video signals, such as an electronic program guide (EPG) data signal, from a plurality of wireless or wired broadcast television signals.

In some embodiments, a communicator 220 is a component used for communication with an external device or a server according to various communication protocols. For example, the communicator may include at least one of a Wifi module, a Bluetooth module, a wired Ethernet module, other network communication protocol chips or near field communication protocol chips, and an infrared receiver. A display apparatus 200 may send and receive a control signal and a data signal with a control device 100 or a server 400 by means of the communicator 220.

In some embodiments, a detector 230 is used for collecting signals from external environment or signals for interacting with outside. For example, the detector 230 includes a light receiver, and a sensor for collecting ambient light intensity, or, the detector 230 includes an image collector, such as a camera, which may be used for collecting external environment scenes, user attributes or user interaction gestures, or, the detector 230 includes a sound collector, such as a microphone, which is used for receiving external sound.

In some embodiments, an external device interface 240 may include, but not limited to, any one or more of the following interfaces: a high definition multimedia interface (HDMI), an analog or data high-definition component input interface (component), a composite video input interface, a composite video broadcast signal (CVBS), a universal serial bus (USB) input interface, and a red, green and blue (RGB) port, and may also be a composite input/output interface formed by a plurality of interfaces.

In some embodiments, a controller 250 and a modem 210 may be located in different individual devices, that is, the modem 210 may also be in an external device of a main device in which the controller 250 is located, such as an external set-top box.

In some embodiments, a controller 250 controls work of the display apparatus and responds to operations from a user by means of various software applications stored on a memory. The controller 250 controls an overall operation of a display apparatus 200. For example, in response to a user operation for selecting a UI object presented on the display 260, the controller 250 may perform an operation relevant to the object selected by the user operation.

In some embodiments, a controller includes at least one of a central processing unit (CPU), a video processing unit, an audio processing unit, a graphics processing unit (GPU), an RAM, an ROM, a first interface to an nth interface for input/output, a communication bus, etc.

The CPU is used for running an operating system and application instructions stored in a memory, and executing various applications, data and contents according to various interaction instructions received from external input so as to finally display and play various audio and video contents. The CPU may include a plurality of processing units, for example, a main processing unit and one or more processing sub-units.

In some embodiments, a graphics processing unit is used for generating various graphic objects, such as at least one of an icon, an operation menu and a graphic element for user command input. The graphics processing unit includes an arithmetic unit, which carries out arithmetic operations by receiving various interaction instructions from a user and displays various objects according to display attributes. The graphics processing unit further includes a renderer for rendering various objects obtained on the basis of the arithmetic unit, and the above rendered objects are used for presentation on a display.

In some embodiments, a video processing unit is used for receiving an external video signal, and performing video processing according to a standard encoding and decoding protocol of the input signal so as to obtain signals that may be directly displayed or played on a display apparatus 200.

In some embodiments, a video processing unit includes at least one of a demultiplexing module, a video decoding module, an image synthesizing module, a frame rate conversion module, a display formatting module, etc.

In some embodiments, an audio processing unit is used for receiving external audio signals, and performing processing according to a standard encoding and decoding protocol of the input signal so as to obtain an acoustical signal that may be played in a speaker.

In some embodiments, a user may input a command on a graphical user interface (GUI) presented on a display 260, and then a user input interface receives, by means of the GUI, the command from the user. Alternatively, the user may input a command by inputting a specific sound or gesture, and then a user input interface identifies the sound or gesture by a sensor to receive the command from the user.

In some embodiments, an input interface 280 is an interface (such as a physical button on a body of a display apparatus) capable of receiving control input.

In some embodiments, a system of a display apparatus may include a kernel, a shell, a file system, and one or more applications. The kernel, the shell and the file system construct a basic operating system structure that allows a user to manage a file, run an application, and use the system. After power up, the kernel is started to activate a kernel space, abstract hardware, initialize hardware parameters, etc., run and maintain a virtual memory, a scheduler, and an IPC. After the kernel has initialized, the shell and the applications are loaded. The applications are compiled into machine codes after being launched to form processes.

Figure 4:
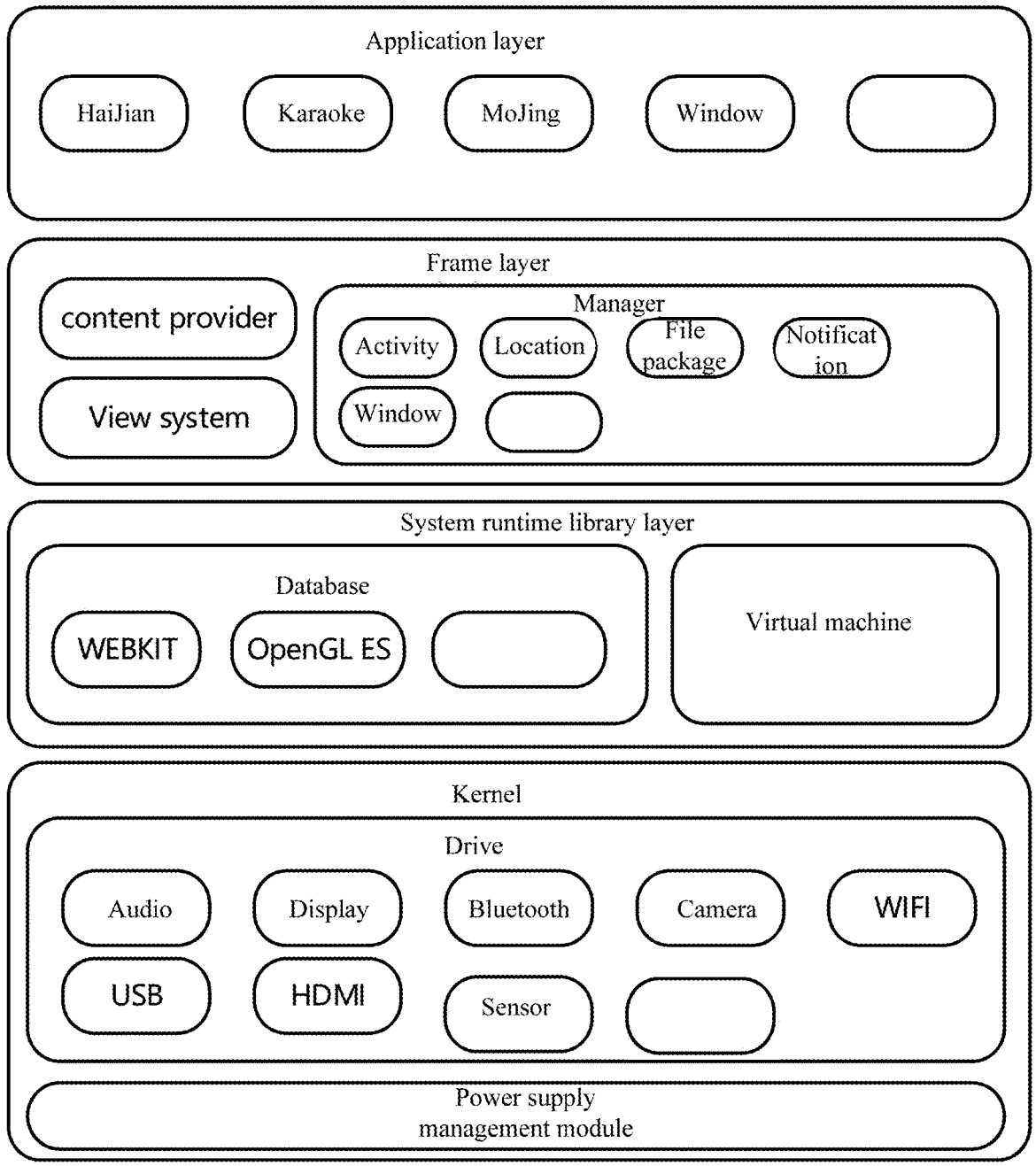
FIG. 4 is a configuration diagram of software of a display apparatus 200 according to some embodiments.

With reference to FIG. 4, in some embodiments, a system is divided into four layers, from top to bottom, an application layer ("application layer" for short), an application framework layer ("framework layer" for short), an Android runtime and system library layer ("system runtime library layer" for short), and a kernel layer.

Digital channels are a set of one or more digital streams. For example, CCTV1 comprises an audio stream, a video stream, etc.

Virtual channel is a name, typically is denoted as a number and is recognized by a user as an entity that will provide access to television programs. It is referred to as "virtual" because its identity (name and number) is defined independently of its physical (RF) location. For example, DTV in North America identifies a virtual channel with (2-1).

Physical channel refers to a 6 MHz band where television signals are embedded for transmission, and is also referred to as a physical transmission channel (PTC). One analog virtual channel fits into one PTC, but a plurality of digital virtual channels typically co-exist in one PTC.

As a common household appliance, a display apparatus is used widely in families, and a user may watch programs on the display apparatus for entertainment. However, when users in some countries use number buttons on a control device to switch channels, they may not find a desired program due to input of wrong number buttons. The reason for the problem may be that a user in some countries or regions merely memorizes a physical channel number for some reasons, but the display apparatus searches for a channel by taking a number input via the number buttons on the remote control as a digital channel number, which may cause the user not locate a desirable channel program.

In view of the above issues, an embodiment of the present application provides a channel switch method for a display apparatus. In the method, an input number is taken as a digital channel number to search for a channel, and after no result is obtained, the input number is taken as a physical channel number to search for a channel again, such that the problem that no result appears when the user inputs a number to search for a channel according to the digital channel number is solved.

In some embodiments, the display apparatus searches for a channel via full-frequency-span channel search, and a specific process includes the following steps that a lowest frequency and a highest frequency are set, a frequency interval is increased each time to sequentially search for channels from the lowest frequency to the highest frequency, and channel information of the searched channel is stored. In some embodiments, the channel information includes a frequency, a physical channel number uniquely corresponding to the frequency, and a digital channel number corresponding to the frequency. It is noted that a plurality of digital channels may be included in a physical channel, and a digital channel corresponds to a digital channel number, such that a frequency may correspond to multiple digital channel numbers.

Figure 5:
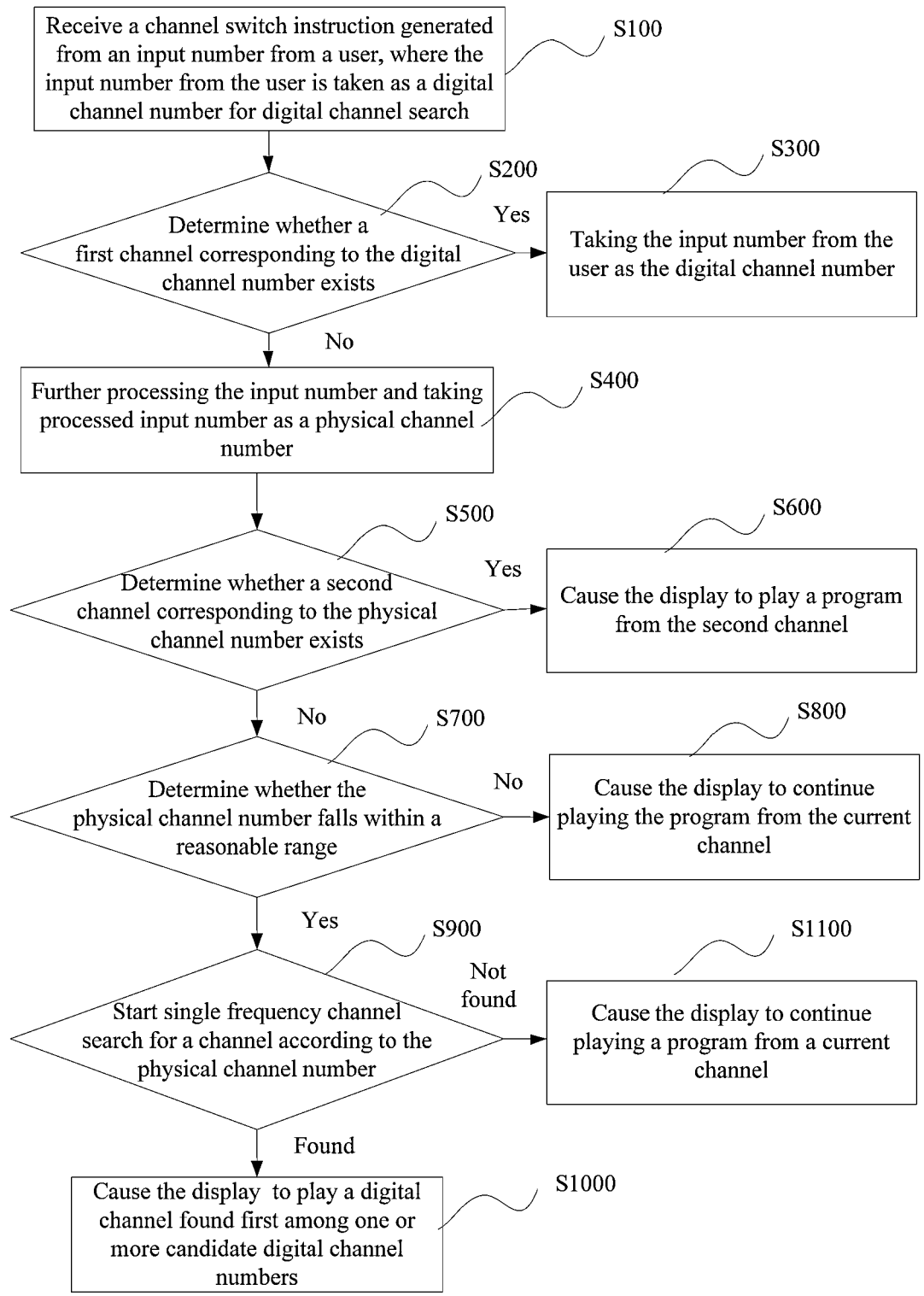
FIG. 5 is a flow diagram of a channel switch method for a display apparatus according to some embodiments.

In some embodiments, as shown in FIG. 5, the method includes the following steps.

S100, receiving a channel switch instruction generated from an input number from a user, where the input number from the user is taken as a digital channel number for digital channel search.

S200, determining whether a first channel corresponding to the digital channel number exists.

Figure 6:
FIG. 6 is a schematic diagram of a user interface according to some embodiments.

In some embodiments, when watching a program, a user may press a number button on a control device to generate a channel switch instruction. In some embodiments, the channel switch instruction is generated when a number button is pressed and no other button press operation is received within a preset time. For example, the user may press a number button 2 on the control device and no other button press operation is received within a preset time, and in this case, a channel switch instruction is generated according to the input number 2. As shown in FIG. 6, when the user presses the number button 2 on the control device and then presses a number button 0 within a preset time, and no other button press operation is received within a preset time after pressing the number button 0, a channel switch instruction is generated according to the input number 20.

In some embodiments, whether there is a first channel corresponding to the digital channel number input is determined by the following process.

Whether the digital channel number is identical to a prestored digital channel number is determined first. In some embodiments, a display apparatus searches for a channel by scanning all channel frequencies to obtain channel information, and the channel information includes a digital channel number, etc. The digital channel number in the channel information is taken as a prestored digital channel number for comparison with a digital channel number input from a user.

When the digital channel number input from the user is identical to the prestored digital channel number, a channel corresponding to the prestored digital channel number is taken as the first channel. For example, as shown in Table 1, Table 1 is a channel information table, digital channel numbers in Table 1 are prestored digital channel numbers, and physical channel numbers in Table 1 is prestored physical channel numbers. When the input number is 7.31, the input number is taken as a digital channel number for search in Table 1, it may be seen that there is a prestored digital channel number 7.31 same as the digital channel number 7.31, and therefore the first channel exists.

TABLE 1

| Physical channel number | Frequency | Digital channel number |
|---|---|---|
| 16 | 485.143 MHz | 7.31 |
| 19 | 503.143 MHz | 5.1 |
| 20 | 509.143 MHz | 2.11/2.12/2.13 |
| 21 | 515.143 MHz | 35.1/35.2/35.3 |

In the embodiments of the present application, for the sake of user's convenience, when the input number is incomplete compared with the prestored digital channel number or the digit(s) of the input number is more than the digit(s) of the prestored digital channel number, the first channel may still be determined. When the digital channel number input from the user is different from the prestored digital channel number, matching is carried out according to analog matching rule. When matching succeeds and a matching result is found, a channel corresponding to a prestored digital channel number matching the digital channel number is taken as the first channel. When matching succeeds and more than one matching result is found, a channel corresponding to a first prestored digital channel number is taken as the first channel. When matching fails, it is indicated that there is no first channel.

For example, when the input number is 7, since the ones place of the prestored digital channel number 7.31 in Table 1 is same as the input number 7, a channel corresponding to the prestored digital channel number 7.31 is determined as the first channel. When the input number is 2.1, the first two digits of prestored digital channel numbers 2.11, 2.12 and 2.13 are same as the two digits of the input number 2.1, and in this case, a channel corresponding to the first prestored digital channel number 2.11 is determined as the first channel. When the input number is 7.3111, the first three digits of 7.3111 are same as the first three digits of the prestored digital channel number 7.31, and in this case, the channel corresponding to the prestored digital channel number 7.31 may be taken as the first channel. In the embodiments of the present application, specific content of the analog matching rule is not limited as the above discussion, as long as the first channel may still be determined when the input number is incomplete compared with the prestored digital channel number or the digit(s) of the input number is more than the digit(s) of the prestored digital channel number.

S300, in response to the first channel existing, taking the input number from the user as the digital channel number. The display is controlled to display a program corresponding to the first channel. When the first channel corresponding to the digital channel number exists, a program from the first channel is played according to the digital channel number and a corresponding frequency. In some embodiments, a channel serial number is obtained from a digital channel number according to a predefined correspondence, and a program from the first channel is played by using the channel serial number and a frequency. For example, with reference to Table 1 again, when a digital channel number corresponding to the first channel is 2.11, a channel serial number of the digital channel number is determined as 1000 according to the predefined correspondence, and the program from the first channel is played by using the channel serial number 1000 and the frequency 509.143 MHz.

S400, in response to the first channel not existing, further processing the input number and taking processed input number as a physical channel number.

S500, determining whether a second channel corresponding to the physical channel number exists. In the embodiments of the present application, in order to reduce errors due to user's wrong memory, when the input number is taken as a digital channel number and the first channel is not found, the input number is taken as a physical channel number for channel search for the second time.

In some embodiments, processing of the input number includes:
  determining whether a preset sign exists in the input number;
  in response to the preset sign existing, a number in front of the preset sign in the input numbers is taken as the processed input number; and in response to the preset sign not exiting, the whole of the input number is taken as the processed input number.

In some embodiments, the preset sign may be a point, a dash, etc. The physical channel numbers are all integers, such that an input number which does not conform to integer rules needs further processed. For example, when the input number has a point, the input number is further processed, and a portion of the input number before the point in the input number is determined as the processed input number. For example, when the input number is 21.12, the input number is processed to obtain the math number 21 as the processed input number, the processed input number 21 is determined as a physical channel number for a second round of channel search, and then whether a second channel corresponding to the physical channel number exists is determined.

In some embodiments, the channel information further includes a physical channel number, and the physical channel number in the channel information is taken as a prestored physical channel number. An input number from the user is determined as a physical channel number, and a prestored physical channel number is searched in the channel information for a match with the physical channel number determined based on the input number from the user.

In some embodiments, determining whether a second channel exists can include: when there is a prestored physical channel number same as the physical channel number in the channel information and the physical channel number corresponds to a digital channel number, a channel corresponding to the digital channel number is determined as the second channel. For example, when the input number is 16.1, the input number is processed to obtain a math number 16 as the processed input number, the processed input number 16 is determined as a physical channel number, with reference to Table 1, there is a prestored physical channel number same with the physical channel number in Table 1, and a channel corresponding to a digital channel number 7.31 corresponding to the prestored physical channel number is determined as the second channel.

When there is a prestored physical channel number same as the physical channel number in the channel information and the physical channel number corresponds to multiple digital channel numbers, a channel corresponding to a digital channel number ranked first among the multiple digital channel numbers is determined as the second channel. For example, when the input number is 21.12, the input number is processed to obtain a math number 21 as the processed input number, the processed input number 21 is taken as a physical channel number, with reference to Table 1, there is a prestored physical channel number which is same as the physical channel number determined in Table 1, the prestored physical channel number corresponds to a plurality of digital channel numbers, and a channel corresponding to a digital channel number 35.1 ranked first among the multiple digital channel numbers is determined as the second channel.

When there is no prestored physical channel number which is same as the physical channel number determined based on the input number in the channel information, it is determined that no second channel exists.

S600, in response to the second channel existing, causing the display to play a program from the second channel. In some embodiments, program playing from the second channel is similar to program playing from the first channel, which will omit herein.

In some embodiments, in a scenario where storage of physical channel number in channel information is incomplete, a user may fail to find a desired channel. In view of this issue, the embodiments of the present application continue channel search in other ways by using the physical channel number, and the method further includes following steps.

S700, in response to the second channel not existing, determining whether the physical channel number falls within a reasonable range. Since physical channel numbers in different countries fall within fixed ranges. For example, physical channel numbers may fall within 2-69 in a certain country. In some embodiments, since a lowest frequency and a highest frequency configured in full frequency span channel search is not appropriate, this may cause a content in channel information to be incomplete, and when the physical channel number falls within a reasonable range, a corresponding channel may exist.

In some embodiments, the method includes: S800, in response to the physical channel number not falling within the reasonable range, cause the display to continue playing the program from the current channel. For example, the physical channel number is 1, and the reasonable range of the physical channel number is 2-69, such that the physical channel number does not fall within the reasonable range, and in this case, it is determined that no channel corresponding to the input number exists, and the display does not change the currently played program.

In some embodiments, S900, in response to the physical channel number falling within the reasonable range, starting single frequency channel search for a channel according to the physical channel number.

The single frequency channel search includes: an upper user interface (UI) issues a physical channel number or directly issues a frequency, a bottom layer processes the physical channel number and the frequency via a tuner (high-frequency tuner) and a demodulator, and when the frequency can be locked, a channel under the current frequency can be determined from the stream, so as to complete the single frequency search.

In some embodiments, S1000, in response no channel being found, cause the display to play a digital channel found first among one or more candidate digital channel numbers. Since the physical channel number may correspond to a plurality of digital channels, that is, corresponds to a plurality of digital channel numbers, a plurality of channels may be found based on the physical channel number, and in the embodiments of the present application, the display apparatus is controlled to play the digital channel ranked first among the plurality of digital channels.

In some embodiments, S1100, in response to no channel being found, causing the display to continue playing a program from a current channel. In the embodiments of the present application, when no channel is found, meaning that there is no channel corresponding to the input number, the display does not change the program from the currently played channel.

In some embodiments, a user presses number buttons on a control device to generate a channel switch instruction while the display apparatus is playing a program, further, in some embodiments, a digital channel number control may be displayed on a user interface for the user to select so as to generate a channel switch instruction. In this case, the channel switch method for a display apparatus includes following steps.

Figure 7:
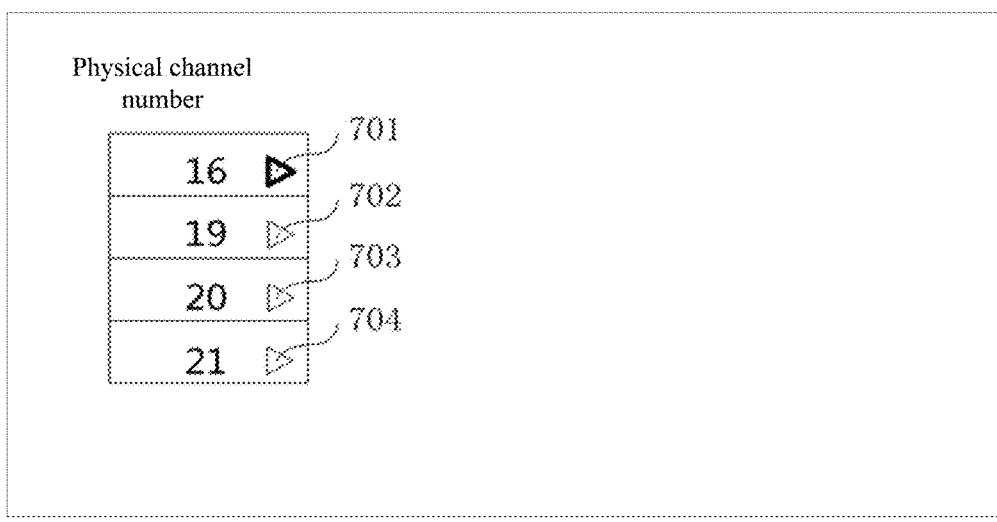
FIG. 7 is a schematic diagram of a user interface according to some other embodiments.

Upon receiving an instruction for presenting a physical channel number, the display apparatus is controlled to present a user interface with a physical channel number control. For example, a user moves a selector via a remote control onto a physical channel number display control and presses a confirm button on the control device, then the user interface skips to a user interface as shown in FIG. 7, the user interface presents physical channel number controls, for example, physical channel number controls 701-704 in FIG. 7.

It should be noted that a control refers to a visual item that is presented on a GUI in a display apparatus to indicate an object, for example, an icon, a thumbnail, a video clip, a link, etc.

Presentation styles of the control are various. For example, the control may contain text content and/or an image for showing a thumbnail related to the text content. For another example, the control may be text and/or an icon corresponding to an application. It should be also noted that the selector is used for indicating that any of the controls, for example, a focus object, has been selected. On one hand, the controls may be selected or controlled by controlling movement of a focus shown on the display according to an input from a user via the control device. For example, the user may control the movement of the focus between controls by direction buttons on the control device so as to select and control a control. On the other hand, a focus may select or capture a control by controlling the focus move among the controls shown on the display according to an input from a user via the control device. For example, the user may cause the controls to move left and right via the direction buttons on the control device, such that the controls can be selected and controlled by the focus while a location of the object in focus is kept unchanged. Presentation forms of the selector are various. For example, the physical channel number control 701 as shown in FIG. 7 may identify the location of the focus object by changing a frame line, a size, a color, transparency, a contour and/or font, etc. of the text or image of a focus control, and may implement or identify the location of the focus object by setting a background color.

Figure 8:
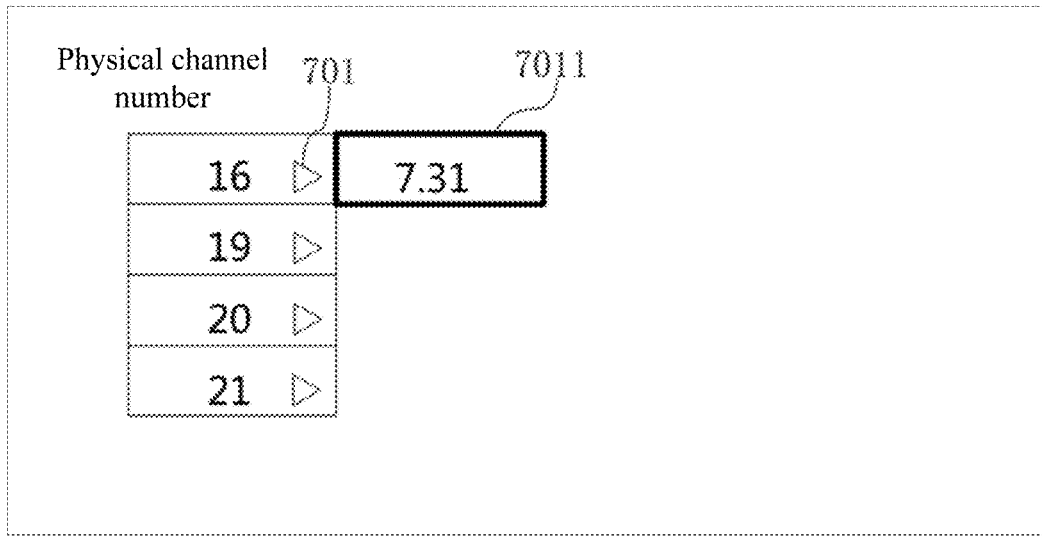
FIG. 8 is a schematic diagram of a user interface according to some still other embodiments.
Figure 9:
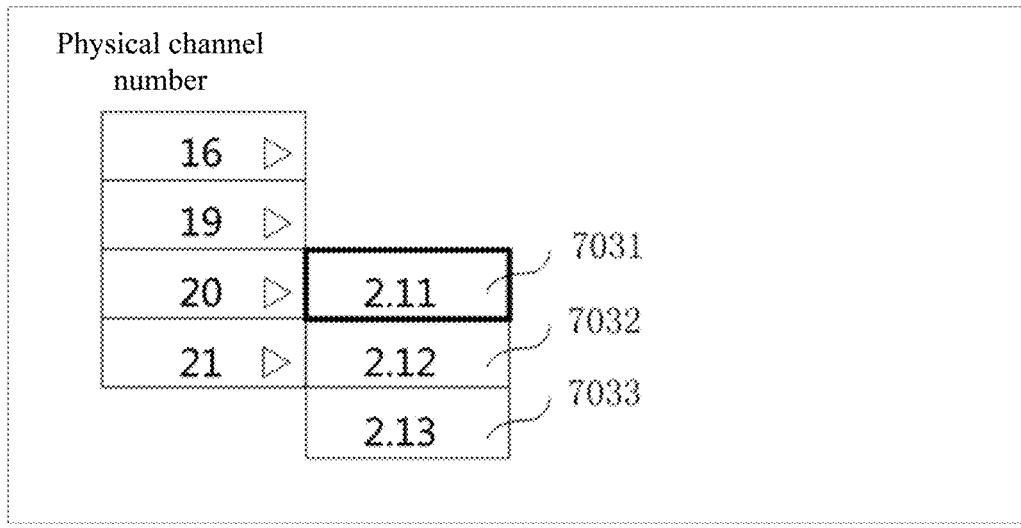
FIG. 9 is a schematic diagram of a user interface according to some still other embodiments.

Upon receiving an instruction for selecting the physical channel number control, the display apparatus is controlled to display a digital channel number control corresponding to the physical channel number control. For example, on the user interface in FIG. 7, the user moves the selector to the physical channel number control 701 via the control device and presses a confirm button on the control device, then the user interface skips to the user interface as shown in FIG. 8, and the user interface displays a digital channel number 7011 corresponding to the physical channel number control. As shown in FIG. 9, when there are a plurality of digital channel controls which can correspond to a physical channel control, the digital channel controls 7031-7033 may be displayed on a user interface in the form of a list.

Upon receiving a channel switch instruction generated from selecting a digital channel number control on an user interface presented on the display, the display apparatus is controlled to play a program from a channel corresponding to the digital channel number control. For example, as shown in FIG. 8, the selector is moved to the digital channel control 7011 via the control device and presses a confirm button on the control device, to cause the user interface on the display apparatus to skip to play a program from a channel corresponding to the digital channel number 7.31.

In the above embodiments, according to the channel switch method for a display apparatus and the display apparatus, when an input number for channel search is received, a channel is searched in multiple modes, so as to reduce user's convenience caused by repeatedly searching. The method includes: receiving a channel switch instruction generated from an input number from a user, determining the input number as a digital channel number, and determining whether a first channel corresponding to the digital channel number exists; when there is no channel corresponding to the digital channel number, meaning that the first channel does not exist, further processing the input number to obtain a processed number as a physical channel number, and determining whether a second channel corresponding to the physical channel number exists; and when there is a second channel corresponding to the physical channel number, causing the display to play a program from the second channel.

In some embodiments, when the display apparatus is implemented as a smart television, the display apparatus may be directly connected with a set-top box to display programs from television channels, or the television channels are watched by a television live broadcast service configured in the display apparatus. An implementation form of the television live broadcast service configured in the display apparatus may be that a live broadcast television application (APP) is installed, and after the live broadcast television APP is started, programs from television channels may be watched on the display apparatus.

When the display apparatus is used for watching television channels, the user may switch channels according to personal preferences, that is, the user may watch more interesting programs by channel switch. Or the user may switch from other applications to the live broadcast APP for program playing. When the television channels are switched, channel switch may be carried out by operating a live broadcast APP or in a Google voice command. For example, during channel selection, the channels may be selected only under the live broadcast APP or Google voice control mode. The app is switched to a live broadcast APP by Google voice command or a remote controller.

In some embodiments, channel switch in the live broadcast APP is implemented by channel selection via the remote control, for example, pressing channel up and channel down buttons on the remote control to select channels, or a list of live broadcast channels is invoked and presented on a display of a display apparatus, and then a channel of interest in the list of live broadcast channels is selected by a user as a target channel for channel switch. Channel switch by Google voice command is implemented by receiving a voice command uttered from a user, searching a local provider service (a service in the live broadcast APP) in local display apparatus to determine a provider ID for channel switch, and determining a corresponding channel name or channel number based on the provider ID, so as to play a program from the corresponding channel.

However, the above two channel switch modes require network to work, and when a remote controller is used for controlling channel selection, a list of live channels is required to be obtained first, then a target channel is selected from the list of live broadcast channels for channel switch, and the channel switch via Google voice control may not support channel switch in a channel up or down mode. It can be seen that interaction of the channel switch modes is inconvenient.

In some embodiments, when the display apparatus is operated in Android system, since many third-party applications developed based on Android system may interact with the television live broadcast service, for example, channel switch via voice control, channel switch via an application, etc., which allows for desirable interaction of channel switch and switch to the live broadcast APP via third-party applications. Thus, in order to enrich channel switch modes for user's selection during channel switch, the embodiments of the present application further provides a channel switch mode, including channel switch in the live broadcast APP via a third-party application, improve convenience during switch from another application to the live broadcast APP, so as to improve the user experience.

However, since the third-party applications usually may not obtain an accurate channel name or channel number, when channel switch is implemented, a new set of configurations are needed for the third-party applications, and the third-party applications may interact with the live broadcast APP to implement APP switch/channel switch as long as the third-party applications meets the configurations.

In some embodiments, a new configuration is that the third-party application needs to send a broadcast package according to a specified format, and the broadcast package carries channel information. The specified format is a preset instruction format, and the format includes a request identifier, a channel switch type, channel information, a request source and other information. The request identifier is used for indicating whether a user request is a channel switch request for channel switch; the channel switch type is used for indicating which type of channel information is used for channel switch; the channel information includes a channel name, a channel number, channel up identifier or channel down identifier; and the request source is used for indicating a target third-party application which issues the channel switch request.

The channel switch method based on a third-party application depends on neither Google voice control, nor a network connection, and does not need to invoke a live broadcast channel list, and may perform channel switch or application switch operation as long as the third-party application sends a broadcast package conforming to the above format requirement.

Figure 10:
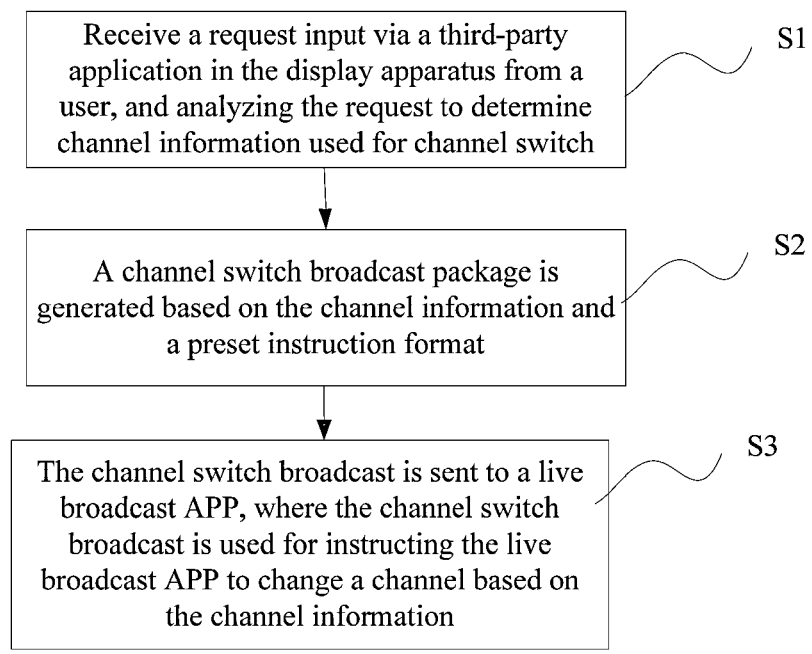
FIG. 10 is a flow diagram of a channel switch method using a third-party application according to some embodiments.
Figure 11:
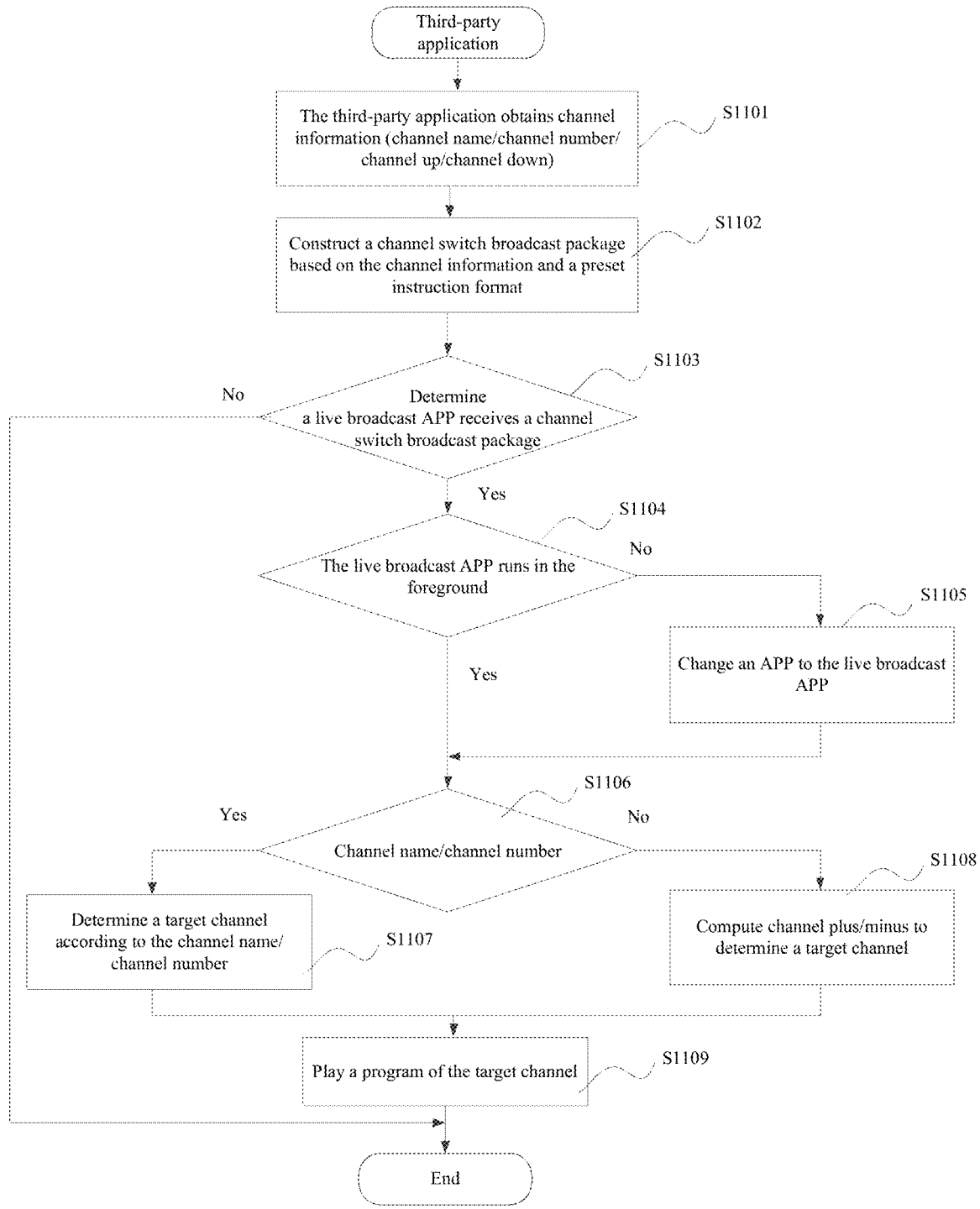
FIG. 11 is a data flow diagram of a channel switch method using a third-party application according to some embodiments.

FIG. 10 is a flow diagram of a channel switch method based on a third-party application according to some embodiments. FIG. 11 is a data flow diagram of a channel switch method based on a third-party application according to some embodiments. An embodiment of the present disclosure provides a display apparatus, including: a display configured to display a user interface; and a controller in connection with the display. When a channel switch method using a third-party application as shown in FIGS. 10 and 11 is performed, the controller is configured to perform the following steps.

S1, receiving a request input via a third-party application in the display apparatus from a user, and analyzing the request to determine channel information used for channel switch.

The third-party application may be an Artificial Intelligence of Things (AIOT) application or an Amazon application. When the channel switch in the live broadcast APP is implemented by a third-party application, the user operates the third-party application to generate a request for channel switch. The request may be generated in a voice control mode (for example, Amazon voice assistant) or a special button (for example, AIOT).

The request is analyzed, since many different kinds of instructions may be generated by operating the third-party application, during channel switch process, the request input from the user requires to be a request for channel switch. Thus, the channel information for channel switch may be obtained by analyzing the request.

Different request types may have different request identifiers. In order to determine whether a request generated from operating the third-party application by a user is a channel switch request, the controller analyzes the request to obtain channel information for channel switch, and is further configured to perform following steps.

Step 11, the request is analyzed to obtain a request identifier and request information.

Step 12, in response to the request identifier indicating the request being a channel switch request, channel information is obtained from the request information, and the channel information includes a channel name, a channel number, a channel up identifier or a channel down identifier.

The request from a user may comprise different types of requests based on different operation behaviors, such that the different requests are configured with corresponding request identifiers. The request from the user is analyzed, and after a request identifier is obtained, whether the currently request from the user is a channel switch request or other types of requests may be determined.

When the request identifier indicates that the user request is a channel switch request, it means that channel switch is needed, and then channel information for channel switch is obtained from the request information. The request information is an execution content corresponding to the request.

In some embodiments, FIG. 11 is a data flow diagram of a channel switch method based on a third-party application according to some embodiments. The third-party application is configured to perform the following steps: S1101, the third-party application obtains channel information (channel name/channel number/channel up/channel down identifier); S1102, constructing a channel switch broadcast package based on the channel information and a preset instruction format; S1103, determine a live broadcast APP receives a channel switch broadcast package; S1104, in response to the live broadcast APP receives a channel switch broadcast package, the live broadcast APP determines whether the live broadcast APP runs in the foreground of the system in the display apparatus; S1105, when the live broadcast APP runs in the background, application switch is carried out, and the live broadcast APP is switched to run in the foreground; S1106, when the live broadcast APP runs in the foreground, the channel switch broadcast package is analyzed to obtain channel name/channel number; S1107, in response to the channel name/channel number is obtained, a target channel is searched according to the channel number; S1108, in response to the channel name/channel number is not obtained, compute channel plus/minus to determine a target channel; S1109, a program of the target channel is played, so as to realize a channel switch process.

In some embodiments, the channel information comprises one of a channel name, a channel number, a channel up identifier, or a channel down identifier. The channel name is the name of a certain channel, for example, CCTV1, CCTV2, etc. The channel number refers to a serial number of a certain channel, for example, a serial number corresponding to CCTV1 is the number 1, and a serial number corresponding to CCTV2 is the number 2. A channel up identifier is used for indicating moving forward a channel with respect to a current channel. A channel down identifier is used for indicating moving backward a channel with respect to a current channel.

After the channel information is obtained, different channel switch broadcast packages may be generated according to different types of channel information.

S2, a channel switch broadcast package is generated based on the channel information and a preset instruction format.

The third-party application sends a corresponding broadcast package according to a preset format, the broadcast package carries the channel information, that is, a channel switch broadcast package conforming to the preset format requirement is generated based on the channel information and the preset instruction format. The channel switch broadcast package may realize interaction between the third-party application and the live broadcast APP.

In some embodiments, to realize interaction between the third-party application and the live broadcast APP, an Intent mechanism is configured in Android system to assist interaction and communication between applications. The Intent is responsible for describing action of one-time operation in the application, action-relating data and additional data, and Android system is responsible for finding a corresponding component according to the description by the Intent, transmitting the Intent to a component to be called and completing calling of the component. The Intent may be used not only for interaction between applications, but also for interaction between Activity/Service inside applications. Therefore, the Intent plays a media intermediary role in the application interaction or Activity/Service interaction and provides relevant information for mutual calling of the components, so as to realize decoupling between a caller and a callee.

Types of the Intent include explicit Intent and implicit Intent. In some embodiments, the implicit Intent is used for constructing a channel switch broadcast package. Implicit Intent: in an implicit type, not explicitly specify which Activity to start, but Action, Data and Category are set to enable the system to filter an appropriate Activity. Filtering is performed according to all <intent-filter>. Intent comprises several parts: action, data, Category, Type, Component, source (from), and extra, etc.

In some embodiments, a channel switch broadcast package is constructed by action, data, Type, source (from) in the implicit Intent.

Since the preset instruction format includes a request identifier (for example, action in the implicit Intent), a channel switch type (for example, Type in the implicit Intent), channel information (for example, data in the implicit Intent), a request source (for example, source (from)

in the implicit Intent), etc., the controller generates a channel switch broadcast package based on the channel information and the preset instruction format, and is further configured to execute the following steps.

Step 21, a corresponding channel switch type is determined based on the channel information, the channel switch type for indicating a channel switch mode.

Step 22, a request identifier and a request source are obtained from the request, the request source is used for indicating a target third-party application which generates the request.

Step 23, a channel switch broadcast package is generated based on the request identifier, the channel switch type, the channel information and the request source.

Different channel switch modes are performed according to different types of channel information, such that the channel switch type may be determined according to the channel information of the request. The channel switch type may be used for distinguishing whether a channel switch mode is executed according to a channel name, a channel number, a channel up identifier or a channel down identifier in the following channel switch process.

For example, when the channel information in the request by operating the third-party application includes a channel name (channelName), for example, CCTV1, a corresponding channel switch type determined is a channel name change type (changeChannelByName). When the channel information comprises a channel number (channelNumber), for example, a number 1, a corresponding channel switch type determined is a channel number change type (changeChannelByNumber). When the channel information comprises a channel up identifier (channelUp), a corresponding channel switch type determined is a channel up change type, and a channel switch count (channelCount) is determined as 1 by default. When the channel information comprises a channel down identifier (channelDown), a corresponding channel switch type determined is a channel down change type, and a channel switch count (channelCount) is determined as 1 by default.

The change count refers to the quantity of channels that need to be switched, that is, the quantity of channels skipped at one time during channel switch. A value corresponding to the change count is equivalent to the number of times that channel up/down is performed, for example, the change count (channelCount) being 1 by default means that channel up/down is performed once by default.

A request identifier and a request source in a request are obtained, and when the request is a channel switch request, the request identifier (actionName) is "com.android.tv.CHANGE_CHANNEL". When the target third-party application which generates the channel switch request is AIOT, the request source (instruction_from) is AIOT. When the target third-party application which generates the channel switch request is Amazon, the request source (instruction_from) is "Amazon".

A channel switch broadcast package is generated based on an order of the request identifier (actionName), a first instruction (channel_instruction_1), a second instruction (channel_instruction_2), and the request source (instruction_from). The first instruction (channel_instruction_1) is a channel switch type, and the second instruction (channel_instruction_2) is channel information. Corresponding channel switch broadcast packages are generated based on different request identifiers, channel switch types, channel information and request sources.

In some embodiments, when channel information is a channel name (channelName), a channel switch broadcast package is generated based on a request identifier (channelName), a channel name change type (changeChannelByName), a channel name (channelName), and a request source (instruction_from).

When the channel information is a channel number (channelNumber), a channel switch broadcast package is generated based on a request identifier (channelName), a channel number change type (changeChannelByNumber), a channel number (channelNumber), and a request source (instruction_from).

When the channel information is a channel up identifier (channelCount), a channel switch broadcast package is generated based on a request identifier (channelName), a channel up change type, channel up (channelUp), and a request source (instruction_from).

When the channel information is a channel down identifier (channelCount), a channel switch broadcast package is generated based on a request identifier (channelName), a channel down change type, channel down (channelDown), and a request source (instruction_from).

The channel switch broadcast package generated based on the foregoing information is a broadcast package with the unified format requirement constructed by the third-party application, so as to realize interaction between the third-party application and the live broadcast APP.

S3, the channel switch broadcast is sent to a live broadcast APP, where the channel switch broadcast is used for instructing the live broadcast APP to change a channel based on the channel information.

After the channel switch broadcast package is constructed by the third-party application according to the foregoing content, the channel switch broadcast package may be sent to the live broadcast APP for channel switch.

Figure 12:
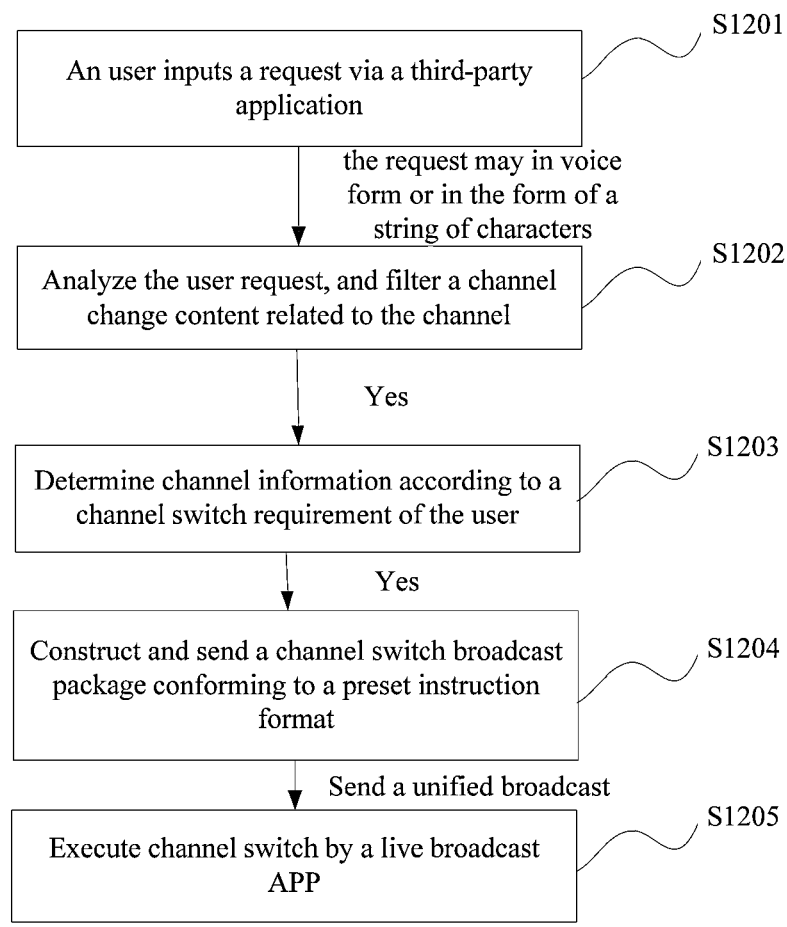
FIG. 12 is a flow diagram of broadcast transmission of a channel switch method using a third-party application according to some embodiments.

FIG. 12 is a broadcast transmission flow diagram of a channel switch method based on a third-party application for a display apparatus according to some embodiments. With reference to FIG. 12, the third-party application is configured to perform the following steps: S1201, a user inputs a request via a third-party application, and the request may in voice form or in the form of a string of characters. S1202, the request is analyzed, and channel switch content related to the channel is filtered. S1203, according to a channel switch requirement from the user, a channel switch mode according to a channel name, a channel number, channel up or channel down is determined. S1204, based on the foregoing information, a channel switch broadcast package conforming to a preset instruction format is constructed and sent. S1205, a live broadcast APP responds to the channel switch broadcast package and perform action of channel switch or changing the APP to the live broadcast APP.

In some embodiments, when a third-party application is used to control a live broadcast APP for channel switch, the live broadcast APP may not immediately respond to a channel switch broadcast package for channel switch because the live broadcast APP may exit and run in the background although the live broadcast APP is in a started state. Thus, in order to guarantee normal channel switch, when the live broadcast APP does not run in the foreground of the display apparatus when the third-party application sends a channel switch broadcast package, APP change needs to be carried out, so as to pull the live broadcast APP running in the background to the foreground.

In view of this, after sending the channel switch broadcast package to the live broadcast APP, a controller is further configured to perform the following steps.

Step 31, a state attribute of the live broadcast APP is obtained.

Step 32, when the state attribute indicates that the live broadcast APP is in a work state, the live broadcast APP is instructed to carry out channel switch based on channel information in response to the channel switch broadcast package.

Step 33, when the state attribute indicates that the live broadcast APP is not in the work state, an APP change broadcast package is generated to call the live broadcast APP, and the live broadcast APP is instructed to carry out channel switch based on channel information in response to the channel switch broadcast package.

After the third-party application constructs the channel switch broadcast package and sends the package to the live broadcast APP, the display apparatus needs to determine the state attribute of the live broadcast APP, and the state attribute is used for indicating whether the live broadcast APP is in a foreground running state.

When the state attribute indicates that the live broadcast APP is in the running state, it means that the live broadcast APP currently runs in the foreground of the display apparatus, and the live broadcast APP may directly respond to the channel switch broadcast package so as to perform channel switch based on the channel information.

When the state attribute indicates that the live broadcast APP is not in the running state, it means that the APP currently running in the foreground of the display apparatus is not the live broadcast APP, the live broadcast APP runs in the background, and in this case, the APP, that is, the source needs to be changed. In this case, an APP change broadcast package is generated, and the live broadcast APP is called to run from the background to the foreground. After running in the foreground, the live broadcast APP may respond to the channel switch broadcast package so as to perform channel switch based on the channel information.

In some embodiments, a live broadcast APP may carry out channel switch based on channel information after receiving a channel switch broadcast package sent from a third-party application.

Thus, the controller instructs the live broadcast APP to carry out channel switch based on the channel information in response to the channel switch broadcast package, and is further configured to perform the following steps.

Step 41, a current channel displayed by the live broadcast APP and channel information carried in the channel switch broadcast package are obtained.

Step 42, based on a target channel corresponding to the channel information, the current channel is switched to the target channel to realize channel switch of the live broadcast APP.

After the third-party application sends the channel switch broadcast package to the live broadcast APP, and after the live broadcast APP runs in the foreground, the current channel displayed by the live broadcast APP is obtained.

The live broadcast APP analyzes the channel switch broadcast package to obtain channel information carried in the broadcast package, the channel information is information of the target channel that the user intends to switch to, and a channel switch mode may be determined based on the channel information. Thus, based on the target channel corresponding to the channel information and the current channel, the live broadcast APP may switch from the displayed current channel to the target channel according to the channel switch mode indicated by the channel information, so as to realize channel switch of the live broadcast APP.

In some embodiments, when the types of the channel information are different, the channel switch modes determined are different, such that the determination of the target channel is different. Thus, after the channel switch broadcast package is analyzed to obtain the channel information, whether the channel information indicates a first switch mode according to a channel name/channel number or a second switch mode according to channel up/down identifier may be determined.

In some embodiments, when it is determined that the channel information indicates the first switch mode according to a channel name/channel number, the controller switches from the current channel to the target channel based on the target channel corresponding to the channel information by performing the following process.

Step 421, when the channel information includes a channel name or a channel number, a target channel corresponding to the channel name or the channel number is determined.

Step 422, the current channel is switched to the target channel to realize channel switch of the live broadcast APP.

When the live broadcast APP analyzes the channel switch broadcast package and determines that the channel information is one of the channel name or the channel number, since the channel name and the channel number may uniquely determine one channel, the corresponding target channel may be determined according to the channel name or the channel number.

For example, when the channel information is a channel name CCTV1, the target channel is CCTV1. When the channel information is a channel number 2, the target channel is CCTV2.

In this case, the current channel displayed by the live broadcast APP may be directly switched to the target channel. For example, when the current channel displayed by the live broadcast APP running in the foreground is CCTV5 and the target channel to which the user intends to switch based on the third-party application is CCTV1, the current channel CCTV5 may be switched to the target channel CCTV1. In this case, content from CCTV1 is displayed on a user interface of the display, so as to realize channel switch of the live broadcast APP.

In some embodiments, when it is determined that the channel information indicates the second switch mode according to channel up/down identifier, the controller switches from the current channel to the target channel based on a target channel corresponding to the channel information by performing the following process.

Step 423, when the channel information includes channel up or channel down identifier, a target channel is determined based on the current channel and a change count of channel up or channel down.

Step 424, the current channel is switched to the target channel to realize channel switch of the live broadcast APP.

When the live broadcast APP analyzes the channel switch broadcast package and determines that the channel information is one of channel up or channel down, since the channel up or channel down realizes channel switch by moving the current channel up or down and a target channel may not be defined uniquely, the target channel that the user intends to switch to needs to be determined in real time based on the current channel and the change count (channelCount) of channel up or down. The change count refers to the number of channels that need to be skipped at one time.

For example, when the channel information carried in the channel switch broadcast package is channel up, and the current channel displayed by the live broadcast APP is CCTV1 and has a corresponding channel number 1, after the live broadcast APP responds to the channel switch broadcast package, based on the channel up identifier, when a change count is determined to be 1, the current channel is moved forward to obtain a next channel (one channel is skipped at a time), that is, CCTV2 corresponding to a channel number 2, and CCTV2 is determined as the target channel. In this case, the live broadcast APP may switch from the displayed current channel CCTV1 to the target channel CCTV2, and the content from CCTV2 is displayed in the user interface of the display, so as to realize channel switch of the live broadcast APP.

When the channel information carried in the channel switch broadcast package is channel down, and the current channel displayed by the live broadcast APP is CCTV5 and has a corresponding channel number 5, after the live broadcast APP responds to the channel switch broadcast package, based on the channel down identifier, when a change count is determined to be 3, the current channel is moved backward to obtain a target channel three channels back from the current channel (three channels are skipped at a time), that is, CCTV2 corresponding to a channel number 2, and CCTV2 is determined as the target channel. In this case, the live broadcast APP may switch from the displayed current channel CCTV5 to the target channel CCTV2, and the content from CCTV2 is displayed in the user interface of the display, so as to realize channel switch of the live broadcast APP.

Although the channel number information in the live channel list is used when the target channel is determined based on the channel up/down information during channel switch in the second switch mode, the live channel list does not need to be called out and presented on the display, and only corresponding channel number information is obtained from the background. Thus, the process may also ensure the convenience of the interaction.

In some embodiments, when a user uses a third-party application to control a live broadcast APP for channel switch, besides using the above method of generating channel information via real-time interaction to perform channel switch, the user may also directly operate the third-party application to determine the channel information which the user intends to switch. In this case, the channel information that interests the user needs to be stored in the third-party application in advance.

In this case, the controller is further configured to perform the following steps.

Step 51, regularly used channel information of the user is obtained.

Step 52, the regularly used channel information is stored in the third-party application, the regularly used channel information stored in the third-party application is used for a user to select a target channel for view.

In order to facilitate selection for the user of a channel program which the user intends to watch most, the user may store the channel information which interests the user, that is, the regularly used channel information is stored in the third-party application. When the user switches a channel, the user may directly select a target channel from the regularly used channel information stored in the third-party application to watch.

The regularly used channel information may be generated by storing one or more favorite channels according to a channel name or a channel number. For example, the user stores their favorite channels CCTV5, CCTV6, etc., or channel numbers 5, 6, etc., into the third-party application.

In some embodiments, based on the foregoing method, channel switch is realized by using an AIOT application to control a live broadcast APP.

Figure 13:
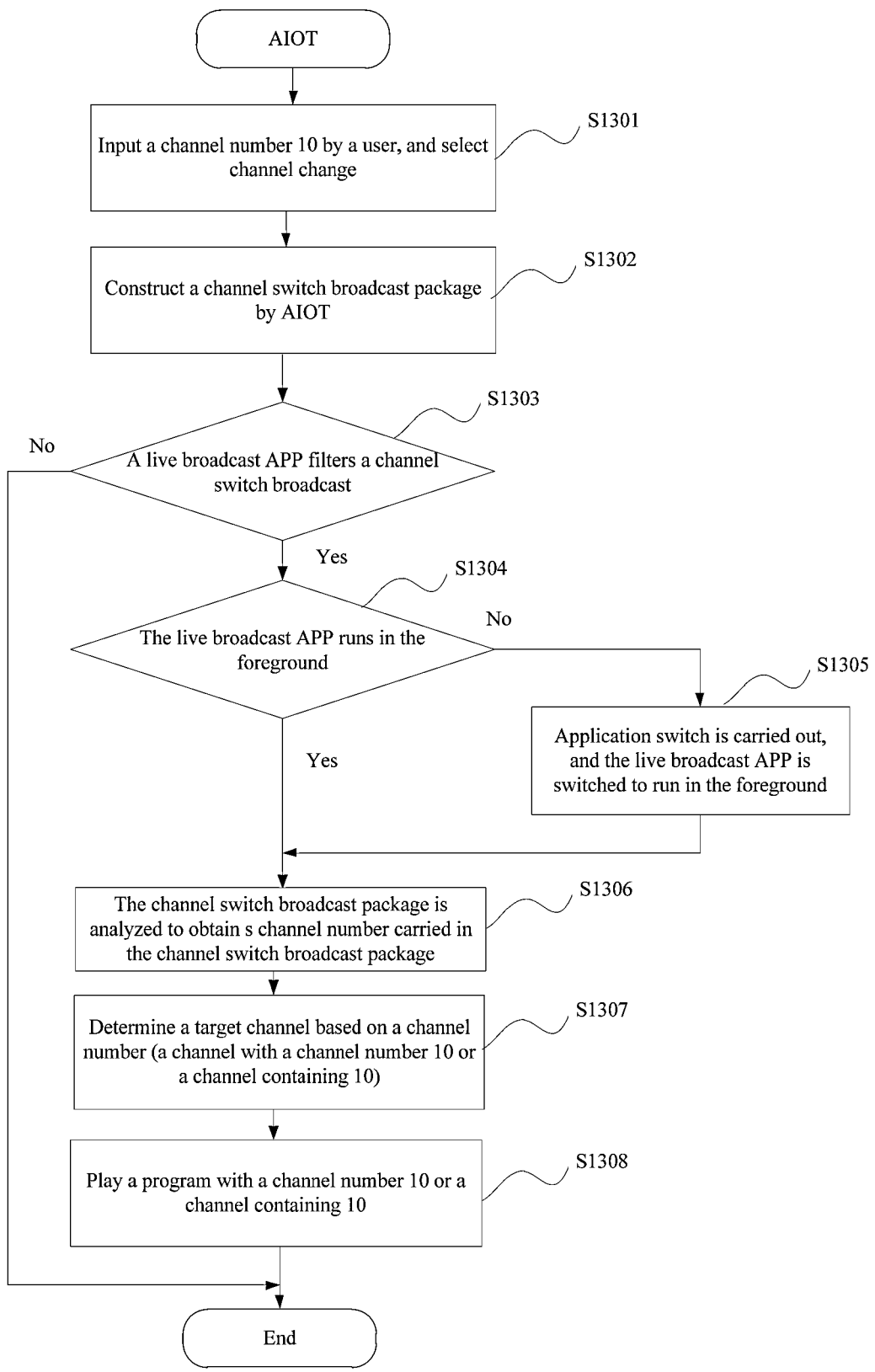
FIG. 13 is an illustrative diagram for implementing channel switch with an AIOT application according to some embodiments.

FIG. 13 is a diagram of implementing channel switch with an AIOT application according to some embodiments. With reference to FIG. 13, the flow comprises: S1301, a user enters channel number 10 via the AIOT application and selects channel switch, a request with a request identifier as a channel switch request and channel information as a channel number is generated based on an operation from the user; S1302, the AIOT application constructs a channel switch broadcast package in a specified format: a request identifier "com.android.tv.CHANGE_CHANNEL", a channel number change type "changeChannelByNumber", a channel number "channelNumber=10", and a request source "instruction_from AIOT".

The AIOT application sends the channel switch broadcast package to a live broadcast APP, and after receiving the channel switch broadcast package, the live broadcast APP is configured to perform: S1303, the live broadcast APP filters a channel switch broadcast; S1304, the live broadcast APP determines whether the live broadcast APP runs in the foreground of the system; S1305, when the live broadcast APP runs in the background, application switch is carried out, and the live broadcast APP is switched to run in the foreground; S1306, when the live broadcast APP runs in the foreground, the channel switch broadcast package is analyzed to obtain s channel number carried in the channel switch broadcast package; S1307, a target channel (a channel with a channel number 10 or a channel number containing 10) is searched according to the channel number; S1308, the target channel with the channel number 10 or containing the number 10 is played, so as to realize a channel switch process.

According to a display apparatus in the embodiments of the present disclosure, when channel switch is implemented by the third-party application, a request is generated by means of the third-party application, and channel information for channel switch is obtained after analysis; the third-party application generates a channel switch broadcast package based on the channel information and a preset instruction format, and sends the channel switch broadcast package to the live broadcast APP; and the live broadcast APP responds to the channel switch broadcast package to realize channel switch based on the channel information. According to the display apparatus, a new channel switch mode may be provided, that is, channel switch of the live broadcast APP is implemented by means of a third-party application, the switch method does not depend on network and does not need to call out a live channel list via internet, and the third-party application only needs to construct a channel switch broadcast package conforming to a preset instruction format and then may interact with the live broadcast APP for channel switch, such that the convenience of operating the live broadcast APP is improved, and user experience is improved.

FIG. 10 is a flow diagram of a channel switch method using a third-party application according to some embodiments. With reference to FIG. 10, an embodiment of the present disclosure provides a channel switch method using a third-party application. The method includes:

S1, a request input via a third-party application from a user is received, and the user request is analyzed, so as to obtain channel information used for channel switch;

S2, a channel switch broadcast package is generated based on the channel information and a preset instruction format; and S3, the channel switch broadcast package is sent to a live broadcast APP, where the channel switch broadcast package is used for instructing the live broadcast APP to perform channel switch based on the channel information.

For ease of explanation, the foregoing description is provided in combination with specific embodiments. However, the above exemplary discussion is not intended to be exhaustive or to limit the embodiments to the specific forms disclosed above. Various modifications and variations can be obtained based on the above teachings. The above embodiments are chosen and described in order to better explain principles and practical application, so as to enable those skilled in the art to better use the embodiments.

What is claimed is:

1. A display apparatus, comprising:
a display, configured to display an image from broadcast system or network and/or a user interface;
a remote control including one or more number buttons;
a communicator configured to communicate with a server via network;
an input interface, configured to receive an input signal from the remote control; and
a controller, in connection with the display, the communicator and the input interface and configured to perform:
receiving a channel switch instruction generated from an input number via the remote control, taking the input number as a digital channel number for a first round of channel search, and determining whether a first channel corresponding to the digital channel number exists in a channel table stored in the display apparatus, wherein the channel table comprises a physical channel number and one or more digital channel number corresponding to the physical channel number;
in response to the first channel not existing in the channel table, further processing the input number to obtain a processed input number and taking processed input number as a physical channel number for a second round of channel search, and determining whether a second channel corresponding to the physical channel number exists in the channel table; and
in response to the first channel existing in the channel table, control the display to play content from the first channel.

2. The display apparatus according to claim 1, wherein the physical channel number and one or more digital channel number are obtained by scanning all frequencies within a range from a lowest frequency to a highest frequency, the lowest frequency and the highest frequency are configured in advance.

3. The display apparatus according to claim 1, wherein the controller is further configured to perform:
in response to the second channel existing in the channel table, causing the display to play content from the second channel.

4. The display apparatus according to claim 1, wherein the controller is further configured to:
determining whether a preset sign exists in the input number;
in response to the preset sign existing in the input number, taking a number in front of the preset sign in the input number as the processed input number; and
in response to the preset sign not exiting in the input number, taking a whole of the input number as the processed input number.

5. The display apparatus according to claim 1, wherein the controller is further configured to perform:
selecting a digital channel number ranked first among the one or more digital channel numbers corresponding to the physical channel number as the second channel, and playing content from the second channel.

6. The display apparatus according to claim 1, wherein the controller is further configured to:
in response to the second channel not existing in the channel table, further determining whether the physical channel number falls within a reasonable range, wherein the reasonable range is configured by physical channel resources in a country;
in response to the physical channel number falling within the reasonable range, starting a single frequency search to locate a third channel according to the physical channel number; and
in response to the physical channel number not falling within the reasonable range, controlling the display to continue playing content from a current channel.

7. The display apparatus according to claim 6, wherein the controller is further configured to perform:
in response to the third channel being found by the single frequency search, controlling the display to play content from the third channel; and
in response to no channel being found by the single frequency search, controlling the display to continue playing content from a current channel.

8. The display apparatus according to claim 1, wherein the controller is configured to perform:
receive an instruction for selecting a control for presenting a first physical channel number; and
in response to the instruction for selecting the control for presenting the first physical channel number, cause the display to present the first physical channel number and one or more digital channel number corresponding to the first physical channel number.

9. The display apparatus according to claim 8, wherein the one or more digital channel numbers are presented in a list form.

10. A channel switching method for a display apparatus, comprising:
receiving a channel switch instruction generated from an input number via a remote control of the display apparatus, taking the input number as a digital channel number for a first round of channel search, and determining whether a first channel corresponding to the digital channel number exists in a channel table stored in the display apparatus, wherein the channel table comprises a physical channel number and one or more digital channel number corresponding to the physical channel number;
in response to the first channel not existing in the channel table, further processing the input number to obtain a processed input number and taking processed input number as a physical channel number for a second round of channel search, and determining whether a second channel corresponding to the physical channel number exists in the channel table; and
in response to the first channel existing in the channel table, control a display to play content from the first channel.

11. The channel switching method for the display apparatus according to claim 10, wherein the physical channel number and one or more digital channel number are obtained by scanning all frequencies within a range from a lowest frequency to a highest frequency, the lowest frequency and the highest frequency are configured in advance.

12. The channel switching method for the display apparatus according to claim 10, further comprising:
   in response to the second channel existing in the channel table, causing the display to play content from the second channel.

13. The channel switching method for the display apparatus according to claim 10, further comprising:
   determining whether a preset sign exists in the input number;
   in response to the preset sign existing in the input number, taking a number in front of the preset sign in the input number as the processed input number; and
   in response to the preset sign not exiting in the input number, taking a whole of the input number as the processed input number.

14. The channel switching method for the display apparatus according to claim 10, further comprising:
   selecting a digital channel number ranked first among the one or more digital channel numbers corresponding to the physical channel number as the second channel, and playing content from the second channel.

15. The channel switching method for the display apparatus according to claim 10, further comprising:
   in response to the second channel not existing in the channel table, further determining whether the physical channel number falls within a reasonable range, wherein the reasonable range is configured by physical channel resources in a country;
   in response to the physical channel number falling within the reasonable range, starting a single frequency search to locate a third channel according to the physical channel number; and
   in response to the physical channel number not falling within the reasonable range, controlling the display to continue playing content from a current channel.

16. The channel switching method for the display apparatus according to claim 15, further comprising:
   in response to the third channel being found by the single frequency search, controlling the display to play content from the third channel; and
   in response to no channel being found by the single frequency search, controlling the display to continue playing content from a current channel.

17. The channel switching method for display apparatus according to claim 10, further comprising:
   receive an instruction for selecting a control for presenting a first physical channel number; and
   in response to the instruction for selecting the control for presenting physical channel number, cause the display to present the first physical channel number and one or more digital channel number corresponding to the first physical channel number.

18. The channel switching method for display apparatus according to claim 17, wherein the one or more digital channel numbers are presented in a list form.

* * * * *